(12) United States Patent
Mu (10) Patent No.: US 10,810,338 B1
(45) Date of Patent: Oct. 20, 2020

(54) METHOD AND DEVICE FOR GENERATING BOUNDARY-SCAN INTERCONNECTION LINES

(71) Applicants: Inventec (Pudong) Technology Corporation, Shanghai (CN); Inventec Corporation, Taipei (TW)

(72) Inventor: Chang-Qing Mu, Shanghai (CN)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 0 days.

(21) Appl. No.: 16/575,890

(22) Filed: Sep. 19, 2019

(30) Foreign Application Priority Data

Sep. 9, 2019 (CN) .......................... 2019 1 0858002

(51) Int. Cl.
*G06F 17/50* (2006.01)
*G06F 11/00* (2006.01)
(Continued)

(52) U.S. Cl.
CPC ........ *G06F 30/3323* (2020.01); *G06F 11/267* (2013.01); *G06F 11/27* (2013.01);
(Continued)

(58) Field of Classification Search
CPC .. G06F 30/3323; G06F 30/20; G06F 2111/20; G06F 11/27; G06F 11/267; G06F 11/273; G01R 31/28
(Continued)

(56) References Cited

U.S. PATENT DOCUMENTS 5,333,139 A * 7/1994 Sturges ............ G01R 31/31853
714/724
5,450,415 A * 9/1995 Kamada ........... G01R 31/31701
714/724
(Continued)

FOREIGN PATENT DOCUMENTS

JP 2003228999 A * 8/2003

OTHER PUBLICATIONS

Wu et al., Chinese Patent Document No. CN-103091627, English abstract and 1 drawing. (Year: 2013).*
(Continued)

*Primary Examiner* — Phallaka Kik
(74) *Attorney, Agent, or Firm* — David R. Stevens; Stevens Law Group (57) ABSTRACT

A method and a device for generating boundary-scan interconnection lines are disclosed. In the method, the boundary scan test model is established according to boundary scan components and intermediate components on least one test card and a unit under test (UUT) board, and connection relationships therebetween; the boundary scan nets of the boundary scan test model are constructed; the boundary scan paths of each boundary scan net are generated, and a path establishment condition of each boundary scan path is obtained; and the boundary scan paths are filtered and integrated, and the filtered and integrated boundary scan paths are divided according to the path establishment conditions of filtered and integrated boundary scan paths, into subtests which each has at least one boundary-scan interconnection line. As a result, the accuracy and high coverage of a path search operation can be guaranteed.

8 Claims, 6 Drawing Sheets

(51) Int. Cl.
*G01R 31/28* (2006.01)
*G06F 30/3323* (2020.01)
*G06F 111/20* (2020.01)
*G06F 11/27* (2006.01)
*G06F 30/20* (2020.01)
*G06F 11/267* (2006.01)
*G06F 11/273* (2006.01)

(52) U.S. Cl.
CPC .............. *G06F 11/273* (2013.01); *G06F 30/20* (2020.01); *G06F 2111/20* (2020.01)

(58) Field of Classification Search
USPC ......... 716/136; 703/14, 15; 714/30, 33, 726, 714/727, 729, 732, 733, 734, 741, 742
See application file for complete search history.

(56) References Cited

U.S. PATENT DOCUMENTS

| | | | | |
|---|---|---|---|---|
| 5,621,740 A | * | 4/1997 | Kamada | G01R 31/31855 714/724 |
| 5,701,307 A | * | 12/1997 | Whetsel | G01R 31/31715 714/29 |
| 5,768,289 A | * | 6/1998 | James | G01R 31/31858 714/727 |
| 5,867,507 A | * | 2/1999 | Beebe | G01R 31/31855 714/726 |
| 6,021,513 A | * | 2/2000 | Beebe | G01R 31/31855 714/726 |
| 6,886,122 B1 | * | 4/2005 | Barthel | G01R 31/31853 714/718 |

OTHER PUBLICATIONS

Bennetts, "Boundary-Scan Tutorial", http://www.asset-intertech.com, ASSET InterTech, Inc., 2000, 78 pages. (Year: 2000).*

Maunder et al., "The Test Access Port and Boundary-Scan Architecture", IEEE COmputer Society Press Tutorial, 1990, 394 pages. (Year: 1990).*

"Unboxing Boundary-Scan Test Part 3: More on Scan Path Verify", https://blog.asset-intertech.com/test_data_out/2019/02/unboxing-boundary-scan-test-part-3-more-on-scan-path-verify.html, Feb. 10, 2019, 6 pages. (Year: 2019).*

* cited by examiner

METHOD AND DEVICE FOR GENERATING BOUNDARY-SCAN INTERCONNECTION LINES

CROSS-REFERENCE TO RELATED APPLICATION

This application claims the benefit of Chinese Application Serial No. 201910858002.7 filed Sep. 9, 2019, which is hereby incorporated herein by reference in its entirety.

BACKGROUND OF THE INVENTION

1. Field of the Invention

The present invention relates to a method and a device for generating boundary-scan interconnection lines, and more particularly to a method which is able to efficiently establish subtests and boundary-scan interconnection lines and guarantee accuracy and high coverage of a path search operation, and a device using the same.

2. Description of the Related Art

Because of having advantages of high test coverage, short test time and accurate fault location, the boundary-scan test technology has gradually developed as an important test manner for motherboards of servers and desktop computers before delivery.

The target motherboard to be tested may be formed by multiple subboards plugged with each other, which are unit under test (UUT) boards, and various test cards are also used and plugged on the UUT boards during the test process, and it causes that boundary scan nets are distributed on the plurality of boards, wherein each UUT board and each test card may have one or more boundary scan components. Furthermore, the circuit involved in each boundary scan net may include a passive component such as a resistor, a capacitor and an inductor, or a signal quality improvement component such as a retimer or a redriver, or a multi-path switching component such as a multiplexer.

Therefore, how to efficiently establish subtests and boundary scan interconnect lines under the premise of existence of multiple plugged boards and various intermediate components, and how to ensure the accuracy and high coverage of the path search operation, are key issues in the industry.

SUMMARY OF THE INVENTION

An objective of the present invention is to provide a method and a device for generating boundary-scan interconnection lines, to solve the conventional problems.

In order to achieve the objective, the present invention provides a method for generating boundary-scan interconnection lines, and the method includes steps: establishing a boundary scan test model according to a plurality of boundary scan components and a plurality of intermediate components on at least one test card and a unit under test (UUT) board, and connection relationships therebetween, wherein the plurality of intermediate components are disposed between the boundary scan components; executing a construction program to construct a plurality of boundary scan nets of the boundary scan test model; executing a path search program on each of the plurality of boundary scan nets, to generate a plurality of boundary scan paths of each of the plurality of boundary scan nets, and obtain a path establishment condition of each of the plurality of boundary scan paths; determining whether the path establishment condition of each of the plurality of boundary scan paths is valid, so as to filter the plurality of boundary scan path; determining whether the filtered boundary scan paths include boundary scan paths reverse to each other, and integrating the boundary scan paths reverse to each other; and executing a dividing program according to the path establishment conditions of the plurality of filtered and integrated boundary scan paths, to divide the filtered and integrated boundary scan paths into a plurality of subtests, wherein each of the plurality of subtests has at least one boundary-scan interconnection line, and each of the plurality of filtered and integrated boundary scan paths is a boundary-scan interconnection line.

In order to achieve the objective, the present invention provides a device for generating boundary-scan interconnection lines, and the device includes a model establishment module, a construction module, a searching module, a processing module and a dividing module. The model establishment module is configured to establish a boundary scan test model according to a plurality of boundary scan components and a plurality of intermediate components on at least one test card and a UUT board, and connection relationships therebetween. The plurality of intermediate component are disposed between the boundary scan components. The construction module is configured to execute a construction program to construct a plurality of boundary scan nets of the boundary scan test model. The searching module is configured to execute a path search program on each of the plurality of boundary scan nets, to generate a plurality of boundary scan paths of each of the plurality of boundary scan nets, and obtain a path establishment condition of each of the plurality of boundary scan paths. The processing module is configured to determine whether the path establishment condition of each of the plurality of boundary scan paths is valid, so as to filter the boundary scan paths, and determine whether the filtered boundary scan paths include boundary scan paths reverse to each other, and then integrate the boundary scan paths reverse to each other. The dividing module is configured to execute a dividing program according to the path establishment conditions of the plurality of filtered and integrated boundary scan paths, to divide the filtered and integrated boundary scan paths into a plurality of subtests which each has at least one boundary-scan interconnection line. Each of the plurality of filtered and integrated boundary scan paths is a boundary-scan interconnection line.

According to above-mentioned contents, the differences between the conventional technology and the method and the device of the present invention are that, in the device and the method of the present invention, the boundary scan test model is established according to the boundary scan components and the intermediate components on the at least one test card and the UUT board, and the connection relationships therebetween, the plurality of boundary scan nets of the boundary scan test model are then constructed, the plurality of boundary scan paths of each boundary scan net are generated, the path establishment condition of each boundary scan paths are obtained, the boundary scan paths are filtered and integrated, and the filtered and integrated boundary scan paths are divided according to the path establishment conditions of the filtered and integrated boundary scan paths, into the plurality of subtests which each has at least one boundary-scan interconnection line.

By aforementioned technical solution, the device and the method of the present invention can establish associations between the boundary scan pins in the fastest speed and the largest range, efficiently establish the subtests and the boundary-scan interconnection lines, and guarantee accuracy and high coverage of a path search operation.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be acknowledged that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the word "comprise" and variations such as "comprises" or "comprising", will be acknowledged to imply the inclusion of stated elements but not the exclusion of any other elements.

The nouns defined herein are explained before illustration of a method and a device for generating boundary-scan interconnection lines. A model establishment module, a construction module, a searching module, a processing module, and a dividing module included in the device for generating boundary-scan interconnection lines, disclosed in the present invention, can be implemented by various manners including hardware, firmware or a combination thereof. For example, in an embodiment, these modules can be implemented by software and/or hardware, and the scope of the present invention is not limited by the examples herein. The software or firmware used in the techniques presented in the embodiment of the present invention can be stored in a machine-readable storage medium such as ROM, RAM, disk storage medium, optical storage medium, and flash memory device, and can be performed by at least one general-purpose or dedicated programmable microprocessor. Furthermore, the model establishment module, the construction module, the searching module, the processing module and the dividing module of the device of the present invention can transmit information and data to each other through a wireless or wired manner.

It should be noted that a target motherboard to be tested can be formed by multiple UUT boards. In order to prevent complicated illustration, the target motherboard to be tested formed by single UUT board is used to illustrate the embodiments below.

Figure 1:
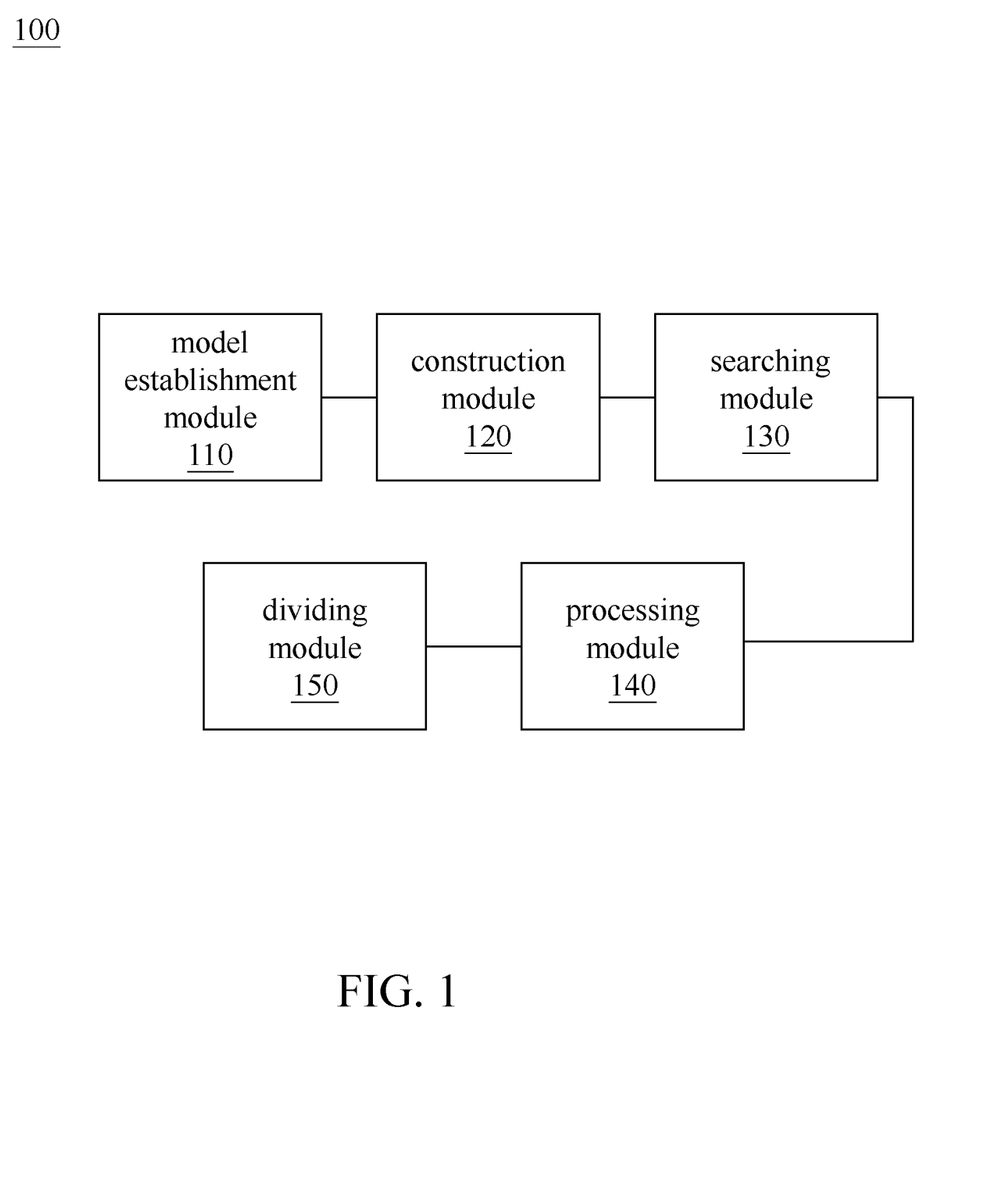
FIG. 1 is a block diagram of an embodiment of a device for generating boundary-scan interconnection lines according to the present invention.
Figure 2:
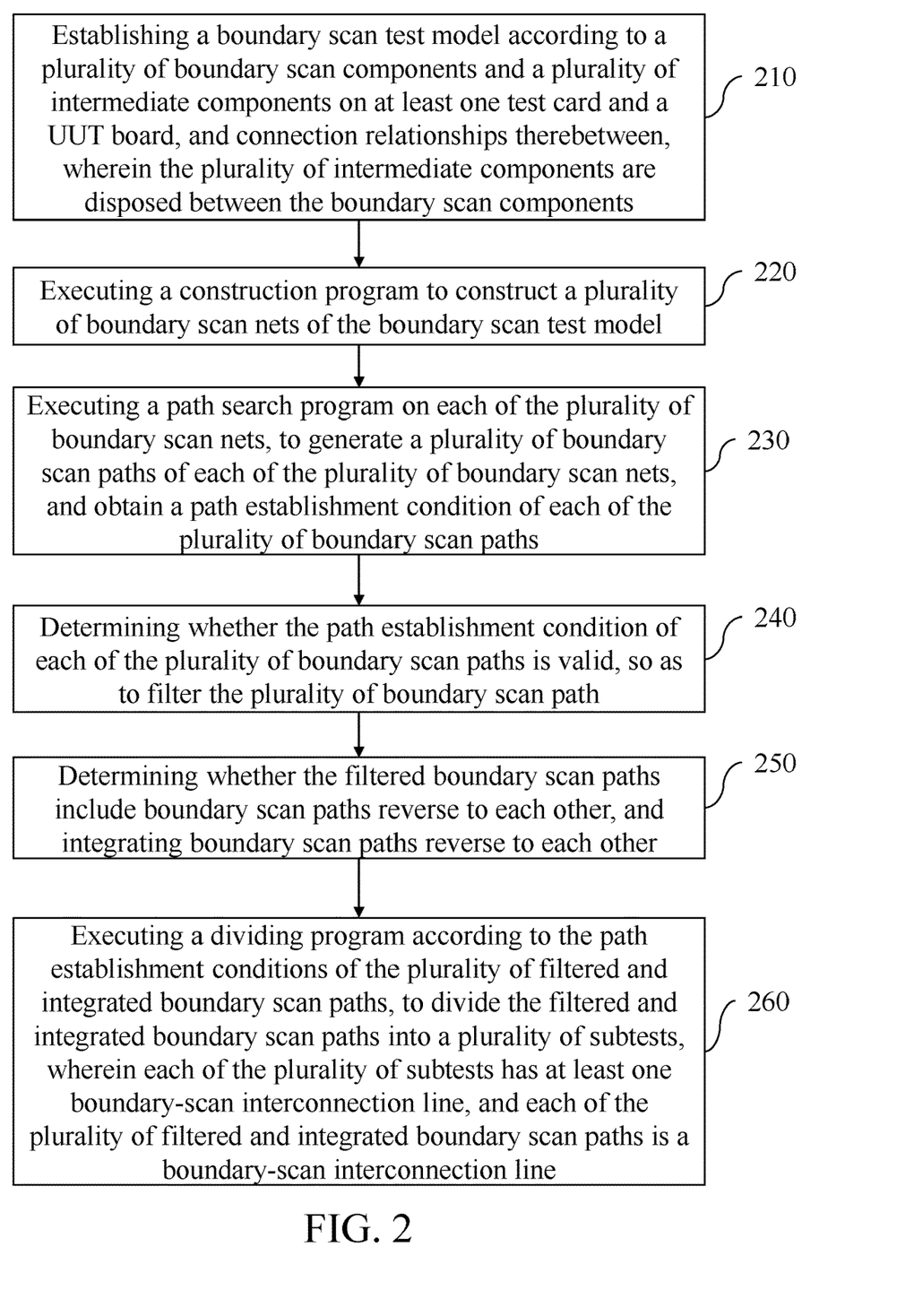
FIG. 2 is a flowchart of an embodiment of a method for generating boundary-scan interconnection lines performed by the device of FIG. 1 according to the present invention.

Please refer to FIGS. 1 and 2. FIG. 1 is a block diagram of an embodiment of a device for generating boundary-scan interconnection lines, according to the present invention, and FIG. 2 is a flowchart of an embodiment of a method for generating boundary-scan interconnection lines performed by the device of FIG. 1 according to the present invention. In this embodiment, the device 100 comprises a model establishment module 110, a construction module 120, a searching module 130, a processing module 140 and a dividing module 150. The model establishment module 110 is connected to the construction module 120, the construction module 120 is connected to the searching module 130, the searching module 130 is connected to the processing module 140, and the processing module 140 is connected to the dividing module 150.

The method for generating boundary-scan interconnection lines can comprise following steps: establishing a boundary scan test model according to a plurality of boundary scan components and a plurality of intermediate components on at least one test card and a UUT board, and connection relationships therebetween, wherein the plurality of intermediate components are disposed between the boundary scan components (step 210); executing a construction program to construct a plurality of boundary scan nets of the boundary scan test model (step 220); executing a path search program on each of the plurality of boundary scan nets, to generate a plurality of boundary scan paths of each of the plurality of boundary scan nets, and obtain a path establishment condition of each of the plurality of boundary scan paths (step 230); determining whether the path establishment condition of each of the plurality of boundary scan paths is valid, so as to filter the plurality of boundary scan path (step 240); determining whether the filtered boundary scan paths include boundary scan paths reverse to each other, and integrating boundary scan paths reverse to each other (step 250); and executing a dividing program according to the path establishment conditions of the plurality of filtered and integrated boundary scan paths, to divide the filtered and integrated boundary scan paths into a plurality of subtests, wherein each of the plurality of subtests has at least one boundary-scan interconnection line, and each of the plurality of filtered and integrated boundary scan paths is a boundary-scan interconnection line (step 260).

In the step 210, the model establishment module 110 can establish the boundary scan test model according to the plurality of boundary scan components and the plurality of intermediate components on the at least one test card and the UUT board, and the connection relationships therebetween. The intermediate components are disposed between the boundary scan components.

For example, the UUT board can comprise a central processing unit (CPU), a platform controller hub (PCH), a plurality of PCIE slots and a plurality of dual in-line memory module (DIMM) slots. A PCIE test card can be plugged into a PCIE slot, and a DIMM test card can be plugged into a DIMM slot. Each of the PCIE test cards and each of the DIMM test card may have at least one boundary scan component. The CPU and PCH also serve as boundary scan components. Each boundary scan component comprises a plurality of boundary scan pins, and the boundary scan components are connected to each other via numerous lines, and various intermediate components may be disposed on the lines, for example, the intermediate component may be a resistor, a redriver, or a multiplexer; however, the present invention is not limited to above-mentioned examples. The target motherboard to be tested can comprise other boundary scan component disposed thereon, for example, the boundary scan component may be a complex programmable logic device (CPLD), or a baseboard management controller (BMC).

Figure 3A:
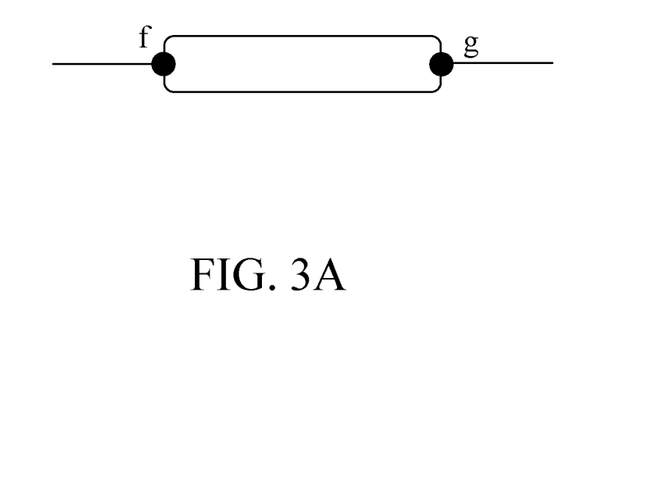
FIG. 3A is a schematic view of a line model of an intermediate component being a resistor according to the present invention.

The model establishment module 110 can define a line model according to an operational logic of each intermediate component. The line model comprises an input pin, an output pin, and a line establish condition which is an establish condition for a line from the input pin to the output pin. Please refer to FIG. 3A, which is a schematic view of a line model of an intermediate component being a resistor according to the present invention. For example, when the signal or data can be transmitted from the pin f to the pin g, the line model corresponding to the resistor can include the input pin f, the output pin g, and an establishment condition being unconditional (that is, the signal/data can be unconditionally transmitted from the input pin f to the output pin g). When the signal or data can be transmitted from the pin g to the pin f, the line model corresponding to the resistor can include the input pin g and the output pin f, and an establishment condition being unconditional (that is, the signal/data can be unconditionally transmitted from the input pin g to the output pin f). The line model corresponding to a resistor can be analogously applied to the line model of an embodiment corresponding to a capacitor or an inductor.

Figure 3B:
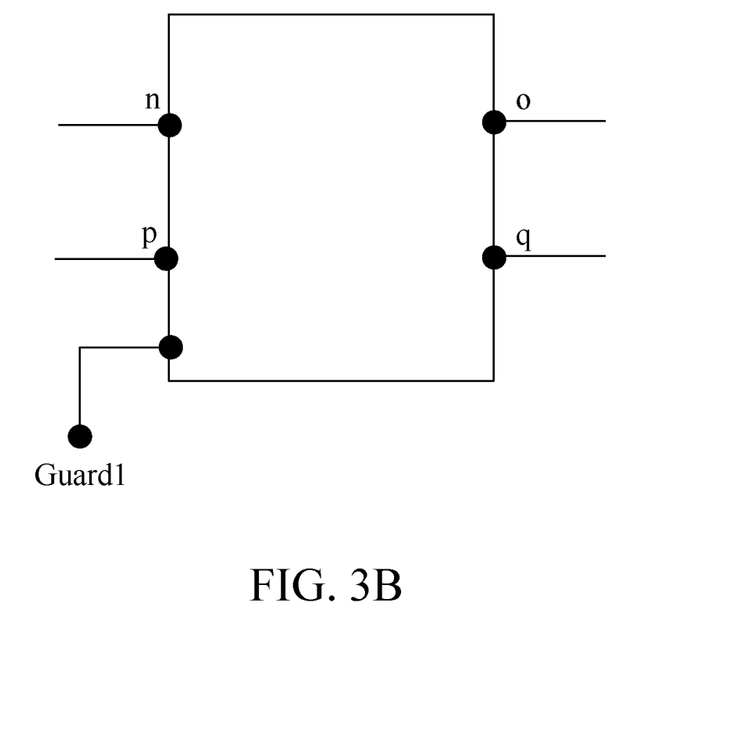
FIG. 3B is a schematic view of a line model of an intermediate component being a redriver according to the present invention.

Please refer to FIG. 3B, which is a schematic view of a line model of an intermediate component being a redriver according to the present invention. When a signal received by the pin Guard1, for enabling and controlling a switching function, is 1 to activate the redriver, and the signal or data can be transmitted from the pin n to the pin o, and from the pin p to the pin q. Thus, there are two line models corresponding to the redriver, and the first line model includes the input pin n, the output pin o, and Guard1=1, which is the line establish condition, and the second line model includes the input pin p, the output pin q, and Guard1=1, which is the line establish condition. Please refer to FIG. 3C, which is a schematic view of an embodiment of a line model of an intermediate component being a multiplexer according to the present invention. When the signal received by the pin Guard2, for enabling and controlling a switching function, is 0, the signal or data can be transmitted from the pin c to the pin d, and when the signal received by the pin Guard2 is 1, the signal or data can be transmitted from the pin c to the pin e. Thus, there are two line models corresponding to the multiplexer, and the first line model includes the input pin c, the output pin d, and Guard2=0, which is the line establish condition, and the second line model includes the input pin c, the output pin e, and Guard2=1, which is the line establish condition. Please refer to FIG. 3D, which is a schematic view of another embodiment of a line model of an intermediate component being a multiplexer according to the present invention. When the signal received by the pin Guard3, for enabling and controlling a switching function, is 0, the signal or data can be transmitted from the pin h to the pin k, and when the signal received by the pin Guard3 is 1, the signal or data can be transmitted from the pin i to the pin k. Thus, there are two line models corresponding to the multiplexer, and the first line model includes the input pin h, the output pin k, and Guard3=0, which is the line establish condition, and the second line model includes the input pin i, the output pin k, and Guard3=1, which is the line establish condition. The aforementioned embodiments are merely examples for illustrating how the model establishment module 110 defines the corresponding line model according to operational logic of each intermediate component, but the present invention is not limited to these examples.

Figure 3C:
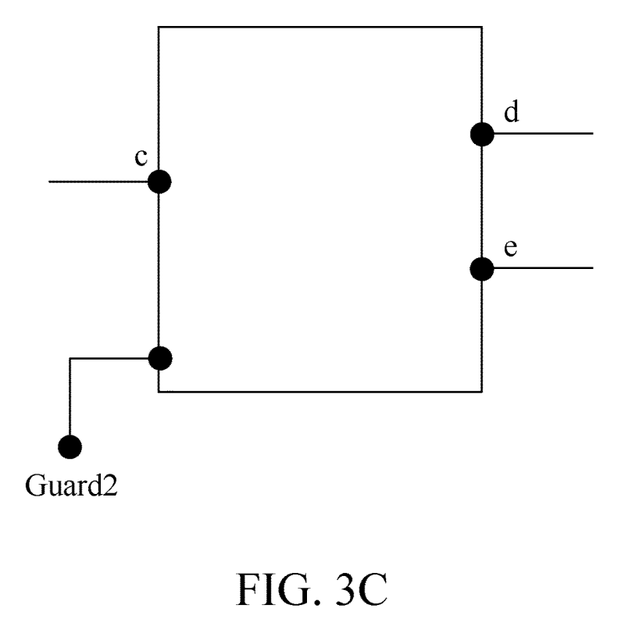
FIG. 3C is a schematic view of an embodiment of a line model of an intermediate component being a multiplexer according to the present invention.
Figure 3D:
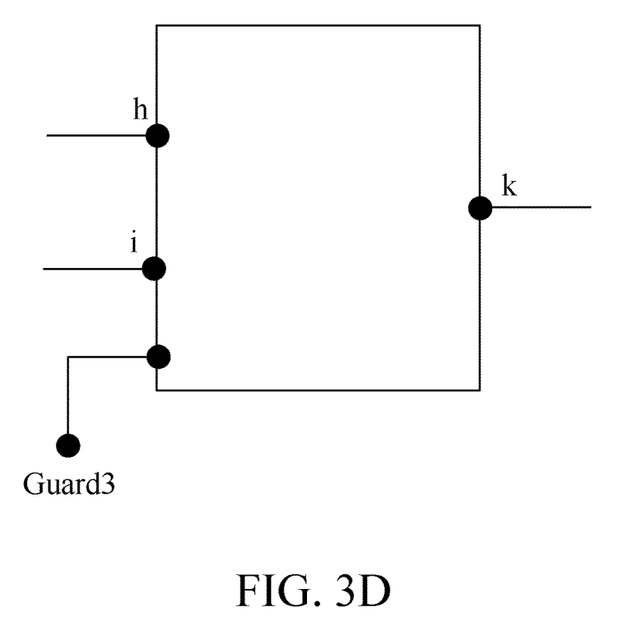
FIG. 3D is a schematic view of another embodiment of a line model of an intermediate component being a multiplexer according to the present invention.

It should be noted that the redriver and the multiplexer of the aforementioned embodiment has only one pin (that is, the pin Guard1, the pin Guard2, or the pin Guard3) for enabling and controlling a switching function respectively, so there are two line models corresponding to the redriver or the multiplexer with the conditions that the signal received by the pin, for enabling and controlling a switching function, is 0 or 1, respectively; however, the present invention is not limited to the above-mentioned embodiment, and the line model can be adjusted according to different types of the intermediate component. In other words, when the certain intermediate component has N pin(s) for enabling and controlling a switching function, there are $2^N$ line models corresponding to the intermediate component, that is, the signal received by each pin, for enabling and controlling a switching function, can be 0 or 1. For example, when an intermediate component has two pins for enabling and controlling a switching function, and the signal received by each pin for enabling and controlling a switching function can be 0 or 1, there are four line models corresponding to the intermediate component; when an intermediate component has three pins for enabling and controlling a switching function, and the signal received by each pin for enabling and controlling a switching function can be 0 or 1, there are eight line models corresponding to the intermediate component.

Figure 3E:
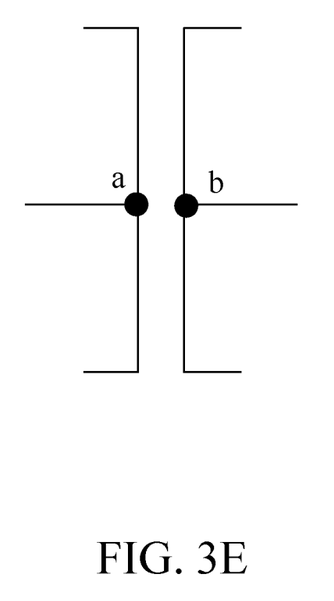
FIG. 3E is a schematic view of an embodiment of a line model of two boards plugged with each other according to the present invention.

The model establishment module 110 can define a line model according to the plugging relationship between the UUT board, and the test card having the boundary scan component. Please refer to FIG. 3E, which is a schematic view of an embodiment of a line model of two boards being plugged with each other according to the present invention. The line model corresponding to the two boards plugged with each other (that is, a circuit board is plugged with another circuit board, so that the two circuit boards are connected to each other), includes the input pin a, the output pin b, and an establishment condition being unconditional (that is, the signal/data can be unconditionally transmitted from the input pin a to the output pin b).

According to the connection relationships of the intermediate components and the boundary scan components, the model establishment module 110 can connect the line model defined by the operational logic of each intermediate component, and the line model defined by the plugging relationship between the UUT board and the test card having the boundary scan component, so as to establish the boundary scan test model. In other words, the model establishment module 110 can uniformly establish the models for the multiple boards plugged with each other, and the various intermediate components. For example, when the circuit of the boundary scan system includes a one-to-two multiplexer, a redriver, and two two-to-one multiplexers, and a test card having a boundary scan component is plugged on the UUT board, which has a boundary scan component disposed thereon, to form the plugging relationship, the model establishment module 110 defines the line model corresponding to the operational logic of the one-to-two multiplexer, the redriver and the two two-to-one multiplexers, and defines the line model corresponding to the plugging relationship, and then connects these line models according to the connection relationships between the one-to-two multiplexer, the redriver, the two two-to-one multiplexers and the boundary scan components, so as to establish the boundary scan test model. Please refer to FIG. 4, which is a schematic view of an embodiment of a boundary scan test model of the present invention. In this embodiment, the boundary scan test model includes five line models which are a line model defined by a one-to-two multiplexer 50, two line models defined by two two-to-one multiplexers 60, a line model defined for a redriver 70, and a line model defined by the plugging relationship. The model establishment module 110 can connect these line models according to the actual connection relationships between the components, which are intermediate components and boundary scan components. Pins A, B, C, D, E, F, G and H are boundary scan pins of different boundary scan components, and pins a, b, c, d, e, f, g, h, i, j, k, m, n, o, p, q, and t are pins of the intermediate components, such as a multiplexer or a redriver; however, the present invention is not limited to this embodiment, and the line model can be adjusted according to the actual circuit condition. The actual circuit of the boundary scan system may include various intermediate components, more boundary scan components and more pins, that is, the actual circuit is more complex than above-mentioned examples. The line model defined by the intermediate component and the line model defined by the plugging relationship may be superimposed with each other.

Figure 4:
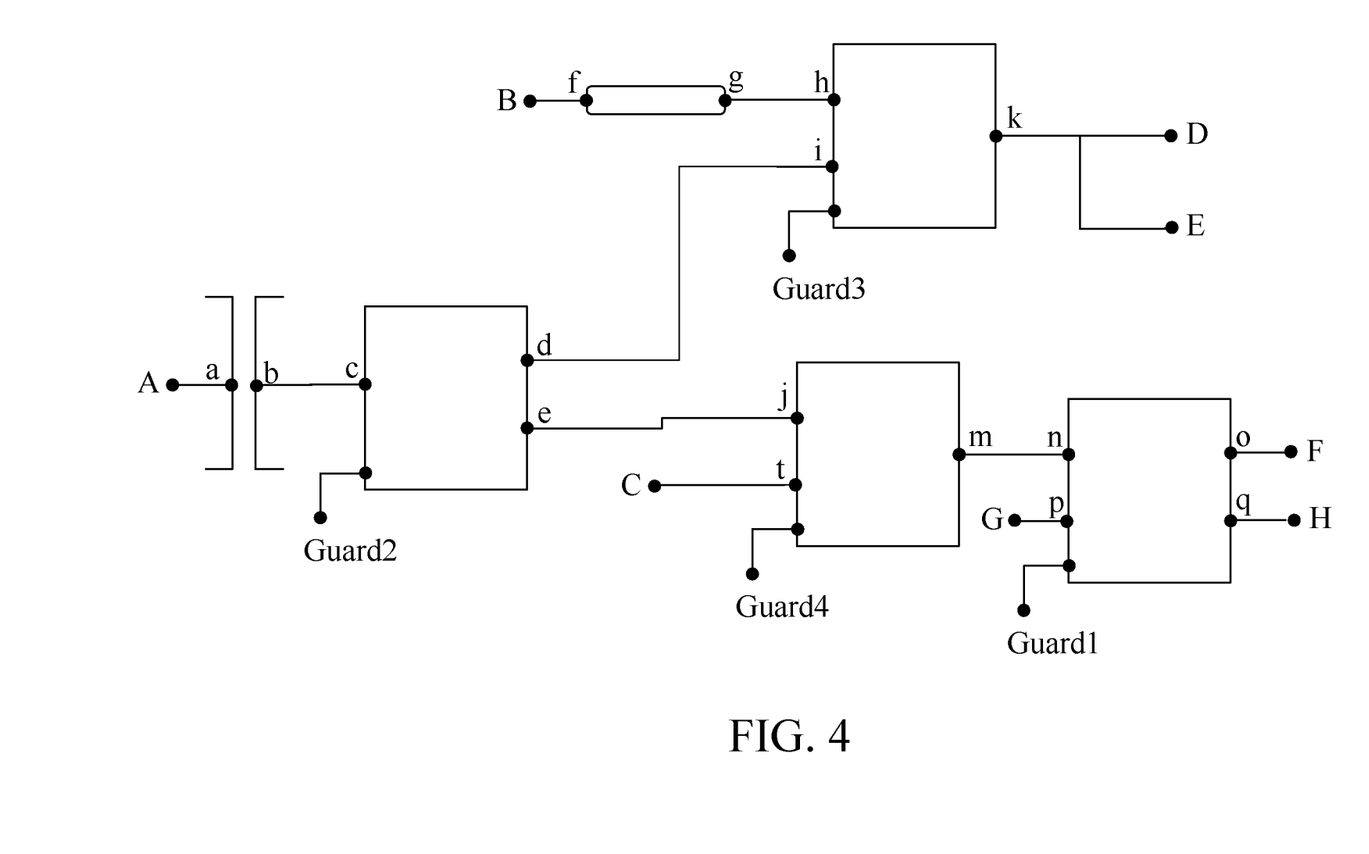
FIG. 4 is a schematic view of an embodiment of a boundary scan test model of the present invention.

In the step 220, the construction module 120 executes a construction program to construct the plurality of boundary scan nets of the boundary scan test model. In more detail, the construction module 120 can use each of boundary scan pins of each boundary scan component as a start point, to perform a line search operation, so as to establish the associations between the boundary scan pins of all boundary scan components, that is, to establish lines between each boundary scan pin and other boundary scan pins, thereby forming the boundary scan nets according to the associations between the boundary scan pins of all boundary scan components. The step 220 can ensure establishment of complete boundary scan nets and no boundary scan pin is ignored. Each boundary scan net can pass through pins of multiple intermediate components, and in actual application, thousands boundary scan nets may be involved in the process of testing the actual circuit of the boundary scan system. The boundary scan test model of FIG. 4 is taken as example, wherein the boundary scan pins A, B, C, D, E, F, G and H are bi-directional pins. The construction module 120 uses each of the boundary scan pins A, B, C, D, E, F, G and H as the start point to perform the line search operation, so as to establish associations between the boundary scan pins A, B, C, D, E, F, G and H, thereby forming two boundary scan nets including a boundary scan net formed by the boundary scan pins A, B, C, D, E and F, and a boundary scan net formed by the boundary scan pins G and H. It should be noted that, in this model, both of the two boundary scan nets pass through the same redriver 70, but the two boundary scan nets are independent from each other, that is, there is no association between the boundary scan pins of the two boundary scan nets.

In the step 230, the searching module 130 executes a path search program on each of the plurality of boundary scan nets, to generate the plurality of boundary scan paths of each boundary scan net and obtain a path establishment condition of each boundary scan path. In more detail, according to specification of the boundary scan protocol, the boundary scan pin can be a bi-directional pin (that is, the pin can transmit the signal or data, and can receive the signal or data) or a unidirectional pin (that is, the pin only transmits the signal or data, or only receives the signal or data). When the searching module 130 executes the path search program on each boundary scan net to generate the boundary scan paths of each boundary scan net, the searching module 130 can select one of the boundary scan pins being the bi-directional pins or the unidirectional pins for transmitting the signal or data in each boundary scan net, as a transmitting end; and the searching module 130 can select other boundary scan pins of the same boundary scan net as the receiving ends, and then use the transmitting end and the receiving ends to perform the path search operation, to generate corresponding boundary scan paths (that is, each boundary scan path is defined as a path from a boundary scan pin to another boundary scan pin of the same boundary scan net), and obtain the path establishment condition of each boundary scan path. The path establishment condition of each boundary scan path comprises line establish conditions of all line models of each the boundary scan path. The boundary scan test model of FIG. 4 is taken as example, wherein the searching module 130 can generate the plurality of boundary scan paths, for example, including paths from the boundary scan pin A to the boundary scan pins B, C, D, E and F, respectively; paths from the boundary scan pin B to the boundary scan pins A, C, D, E and F, respectively; paths from the boundary scan pin C to the boundary scan pins A, B, D, E and F, respectively; paths from the boundary scan pin D to the boundary scan pins A, B, C, E and F, respectively; paths from the boundary scan pin E to the boundary scan pins A, B, C, D and F, respectively; paths from the boundary scan pin F to the boundary scan pins A, B, C, D and E, respectively; a path from the boundary scan pin G to the boundary scan pin H; and a path from the boundary scan pin H to the boundary scan pin G.

In the step 240, the processing module 140 determines whether the path establishment condition of each boundary scan path is valid, so as to filter the boundary scan paths. In more detail, when the path establishment condition of the certain boundary scan path is invalid and should be removed, for example, the boundary scan path passes through three pins of the same multiplexer, the processing module 140 determines that the boundary scan path is invalid, and needs to be filtered out and then removes this invalid boundary scan path. Please refer to FIG. 4, for example, the path from the boundary scan pin A to the boundary scan pins B include paths from the pin A to the pin a, from the pin a to the pin b, from the pin b to the pin c, from the pin c to the pin d, from the pin d to the pin i, from the pin i to the pin k, from the pin k to the pin h, from the pin h to the pin g, from the pin g to the pin f, and from the pin f to the pin B; however, the path from the boundary scan pin A to the boundary scan pins B passes three pins i, k and h of the two-to-one multiplexer 60. Under a condition that the signal received by the pin Guard3 is 1, this path is established only when the signal received by the pin h is 1, and under a condition that the signal received by the pin Guard3 is 0, this path is established only when the signal received by the pin i is 1. The establishment conditions of these two paths conflict, so the boundary scan path from the boundary scan pin A to the boundary scan pin B is invalid and removed.

In the step 250, the processing module 140 determines whether the filtered boundary scan paths comprise boundary scan paths reverse to each other, and integrates the boundary scan paths reverse to each other. In more detail, during the boundary scan test process, the testing direction is determined by the type of the boundary scan pin and the related hardware protocol, so it is not necessary to determine the testing direction of the boundary scan net in the path search program. When the filtered boundary scan paths comprise the boundary scan paths reverse to each other (that is, the transmitting and the receiving ends of a boundary scan path are reverse to that of the other boundary scan path), the processing module 140 can combine the boundary scan paths reverse to each other, to combine the two boundary scan paths as a boundary scan path, thereby integrating the repeated boundary scan paths.

In the step 260, the dividing module 150 executes a dividing program according to the path establishment condition of each of the filtered and integrated boundary scan paths, to divide the filtered and integrated boundary scan paths into a plurality of subtests which each has at least one boundary-scan interconnection line. Each filtered and integrated boundary scan path is a boundary-scan interconnection line. In more detail, when the dividing module 150 executes the dividing program according to the path establishment condition of each filtered and integrated boundary scan path, the boundary scan paths having the same path establishment conditions are integrated as the same subtest, and this path establishment condition is used as a subtest condition of this subtest. When a certain subtest condition can be included in another subtest condition, for example, a subtest condition is that the signal received by the pin Guard2 for enabling and controlling a switching function is 1 (that is, Guard2=1), and another subtest condition is that the signal received by the pin Guard3 for enabling and controlling a switching function is 1 and the signal received by the pin Guard2 for enabling and controlling a switching function is 1, (that is, Guard3=1 and Guard2=1), the subtest condition Guard2=1 is included in another subtest condition Guard3=1 and Guard2=1, so the dividing module 150 can integrate the two subtests as one subtest. Therefore, the dividing module 150 can divide the filtered and integrated boundary scan paths, into the plurality of subtests which each has at least one boundary-scan interconnection line, and each filtered and integrated boundary scan path is a boundary-scan interconnection line.

It should be noted that, when the certain subtest condition can be included in another subtest condition, the dividing module 150 can integrate the subtest corresponding to the certain subtest condition and the subtest corresponding to another subtest condition, as one subtest.

According to above-mentioned contents, the differences between the conventional technology and the present invention are that, in the present invention, the boundary scan test model can be established according to the boundary scan components and the intermediate components on the at least one test card and the UUT board, and the connection relationships therebetween, and the plurality of boundary scan nets of the boundary scan test model can be constructed, and the plurality of boundary scan paths of each boundary scan nets can be generated and the path establishment condition of each boundary scan path can be obtained, and the boundary scan paths are filtered and integrated, the filtered and integrated boundary scan paths are divided, according to the path establishment conditions of the filtered and integrated boundary scan paths, into the plurality of subtests which each has at least one boundary-scan interconnection line, so that the associations between the boundary scan pins can be established in the fastest speed and the largest range, and the subtests and the boundary-scan interconnection lines thereof can be established efficiently, and the accuracy and the high coverage of the search path operation can be guaranteed. Furthermore, the technical solution of the present invention can prevent date loss due to multiple boards plugged with each other.

The present invention disclosed herein has been described by means of specific embodiments. However, numerous modifications, variations and enhancements can be made thereto by those skilled in the art without departing from the spirit and scope of the disclosure set forth in the claims.

What is claimed is:
1. A method for generating boundary-scan interconnection lines, comprising:
   establishing a boundary scan test model according to a plurality of boundary scan components and a plurality of intermediate components on at least one test card and a UUT board, and connection relationships therebetween, wherein the plurality of intermediate components are disposed between the boundary scan components;
   executing a construction program to construct a plurality of boundary scan nets of the boundary scan test model;
   executing a path search program on each of the plurality of boundary scan nets, to generate a plurality of boundary scan paths of each of the plurality of boundary scan nets, and obtain a path establishment condition of each of the plurality of boundary scan paths;
   determining whether the path establishment condition of each of the plurality of boundary scan paths is valid, so as to filter the plurality of boundary scan paths;

determining whether the filtered boundary scan paths comprise boundary scan paths reverse to each other, and integrating the boundary scan paths reverse to each other; and executing a dividing program, according to the path establishment condition of each of the plurality of filtered and integrated boundary scan paths, to divide the filtered and integrated boundary scan paths into a plurality of subtests which each has at least one boundary-scan interconnection line, wherein each of the plurality of filtered and integrated boundary scan paths is the boundary-scan interconnection line.

2. The method according to claim 1, wherein the construction program comprises:

using each of a plurality of boundary scan pins of each of the plurality of boundary scan components as a start point to perform a line search operation, to establish associations between the plurality of boundary scan pins of all of the plurality of boundary scan components; and forming the plurality of boundary scan nets according to the associations between the plurality of boundary scan pins of all of the plurality of boundary scan components.

3. The method according to claim 1, wherein the path search program comprises:

in each of the plurality of boundary scan nets, selecting one of the plurality of boundary scan pins being bi-directional pins or unidirectional pins for transmitting data, as a transmitting end, and selecting another boundary scan pin in the same boundary scan net as a receiving end, so as to perform the path search operation to generate the corresponding boundary scan paths, and obtain the path establishment condition of each of the corresponding boundary scan paths.

4. The method according to claim 1, wherein the dividing program comprises:

integrating the boundary scan paths having the same path establishment conditions as one subtest, and using the path establishment condition as a subtest condition of the subtest; and when a certain subtest condition is comprised in another subtest condition, integrating the two subtests corresponding to the certain subtest condition and the another subtest condition, as one subtest.

5. A device for generating boundary-scan interconnection lines, comprising:

a model establishment module configured to establish a boundary scan test model according to a plurality of boundary scan components and a plurality of intermediate components of at least one test card and a UUT board, and connection relationships therebetween, wherein the plurality of intermediate components are disposed between the plurality of boundary scan components;

a construction module configured to execute a construction program to construct a plurality of boundary scan nets of the boundary scan test model;

a searching module configured to execute a path search program on each of the plurality of boundary scan nets, to generate a plurality of boundary scan paths of each of the plurality of boundary scan nets, and obtain a path establishment condition of each of the plurality of boundary scan paths;

a processing module configured to determine whether the path establishment condition of each of the plurality of boundary scan paths is valid, so as to filter the boundary scan paths, and determine whether the filtered boundary scan paths comprise boundary scan paths reverse to each other, and integrate boundary scan paths reverse to each other; and a dividing module configured to execute a dividing program, according to the path establishment condition of each of the plurality of filtered and integrated boundary scan paths, to divide the filtered and integrated boundary scan paths into a plurality of subtests which each has at least one boundary-scan interconnection line, wherein each of the plurality of filtered and integrated boundary scan paths is the boundary-scan interconnection line.

6. The device according to claim 5, wherein during execution of the construction program, the construction module uses each of the plurality of boundary scan pins of each of the plurality of boundary scan components as a start point to perform a line search operation, to establish associations between the plurality of boundary scan pins of all of the plurality of boundary scan components, so as to form the plurality of boundary scan nets according to the associations between the plurality of boundary scan pins of all of the plurality of boundary scan components.

7. The device according to claim 5, wherein during execution of the path search program, the searching module selects each of the plurality of boundary scan pins being bi-directional pins and unidirectional pins for transmitting data in each of the plurality of boundary scan nets, as a transmitting end, and selects another of the plurality of boundary scan pins in the same boundary scan net as a receiving end, and then performs the path search operation to generate the plurality of boundary scan paths corresponding thereto, and obtain the path establishment condition of each of the plurality of boundary scan paths.

8. The device according to claim 5, wherein during execution of the dividing program, the dividing module integrates the plurality of boundary scan paths having the same path establishment conditions as a subtest, and the path establishment condition is used as a subtest condition of the subtest, and when a certain subtest condition is comprised in another subtest condition, the dividing module integrates the two subtests corresponding to the two subtest condition, as the same subtest.

* * * * *